United States Patent
Van Buul et al.

[19]

[11] Patent Number: 5,990,641
[45] Date of Patent: Nov. 23, 1999

[54] MOTOR CONTROL DEVICE APPARATUS FOR THE RECORDING AND/OR REPRODUCTION OF INFORMATION INCLUDING THE MOTOR CONTROL DEVICE

[75] Inventors: Marinus C. W. Van Buul; Gerardus A. M. Van Beijsterveld; Nicolaas J. Damstra, all of Breda; Henricus C. J. Büthker, Mierlo, all of Netherlands

[73] Assignee: U.S. Philips Corporation, New York, N.Y.

[21] Appl. No.: 08/966,723

[22] Filed: Nov. 10, 1997

[30] Foreign Application Priority Data

Nov. 19, 1996 [EP] European Pat. Off. .............. 96203237

[51] Int. Cl.$^6$ .................................................. H02K 23/00
[52] U.S. Cl. .......................... 318/254; 318/799; 318/432; 318/433
[58] Field of Search .................................... 318/138, 254, 318/439, 799

[56] References Cited

U.S. PATENT DOCUMENTS

| | | | |
|---|---|---|---|
| 4,250,435 | 2/1981 | Alley et al. | 318/138 |
| 4,752,724 | 6/1988 | Radziwill et al. | 318/254 |
| 5,223,771 | 6/1993 | Chari | 318/254 |
| 5,572,099 | 11/1996 | Carobolante | 318/434 |

*Primary Examiner*—William M. Shoop, Jr.
*Assistant Examiner*—Rita Leykin
*Attorney, Agent, or Firm*—Edward W. Goodman

[57] ABSTRACT

A motor control device controls an electric 3-phase brushless d.c. motor (10) having a magnetic rotor (15) and three windings (11, 12, 13). The motor control device includes a detection unit (20) adapted to generate a commutation signal (21) on the basis of the back-emf voltage produced in the windings (11, 12 and 13). The motor control device further includes an output stage (30) having a first terminal (31) and a second terminal (32) for the connection of a power-supply source, outputs (33, 34, 35) for the connection of the windings (11, 12 and 13) and a number of semiconductor elements (36) for selectively coupling the terminals (31, 32) to the outputs (33, 34, 35) in dependence upon the commutation signal (21). The motor control device further includes a phase detector (40) adapted to generate a phase-error signal (43) which is representative of the phase difference between a sensor signal and a reference signal. The output stage (30) is arranged in series with a controllable power-supply stage (50) adapted to feed a bidirectional current (I) through the windings (11, 12, 13) via the outputs (33, 34, 35). The current (I) is controlled in dependence upon the phase-error signal (43) for driving the rotor (15) in a controlled manner, or for actively braking said rotor.

8 Claims, 4 Drawing Sheets

MOTOR CONTROL DEVICE APPARATUS FOR THE RECORDING AND/OR REPRODUCTION OF INFORMATION INCLUDING THE MOTOR CONTROL DEVICE

BACKGROUND OF THE INVENTION

1. Field of the Invention

The invention relates to a motor control device for controlling an electric multi-phase brushless d.c. motor having a magnetic rotor and a plurality of windings, the motor control device comprising a detection unit adapted to generate a commutation signal on the basis of the back-emf voltage produced in the windings, and an output stage having outputs for the connection of the windings, at least one terminal for the connection of a power-supply source, and a plurality of control elements for selectively coupling the terminal to outputs in dependence upon the commutation signal.

The invention further relates to an apparatus for the recording and/or reproduction of information, comprising means for recording and/or reproducing information in a cycle, this cycle being in synchronism with a periodic reference signal, a motor for driving an element which cooperates with said recording and/or reproducing means, a sensor for detecting the position of said element, said sensor generating a sensor signal, and a motor control device for controlling the motor.

2. Description of the Related Art

Such a motor control device is known from U.S. Pat. No. 4,752,724. The known motor control device comprises a detection unit connected to the windings of a three-phase brushless d.c. motor for detecting the back-emf voltage generated in the windings. On the basis of the detected back-emf voltage, a commutation signal is generated. The known motor control device further has an output stage comprising a plurality of bipolar transistors for selectively coupling the windings to a power source. The transistors are controlled by a signal generator which is controlled by means of the commutation signal. The known motor control device is suitable for energizing the windings of a brushless motor in accordance with a given pattern for which the windings generate such a rotary field that the rotor is constantly driven.

SUMMARY OF THE INVENTION

It is an object of the invention to provide a motor control device which allows a brushless d.c. motor to be included in a control loop and which enables a large bandwidth of the control loop to be obtained. To this end, the motor control device in accordance with the invention is characterized in that the motor control device comprises a phase detector having a first input for receiving a periodic sensor signal related to the instantaneous position of the rotor, and a second input for receiving a periodic reference signal, the detector being adapted to generate a phase-error signal which is representative of the phase difference between the sensor signal and the reference signal, and a controllable power-supply stage adapted to feed a bidirectional current via the outputs of the output stage in dependence upon the phase-error signal for driving and braking the rotor in a controlled manner.

By means of the measures in accordance with the invention, it is achieved that the rotor can be accelerated or actively braked depending on the sign of the phase difference between the sensor signal and the reference signal. The power-supply stage in the motor control device, in accordance with the invention, enables the current through the windings to be controlled in magnitude and to be reversed independently of the commutation signal, and allows a smooth transition from driving of the rotor to active braking of the rotor to be obtained. Owing to the possibility of active braking, this motor control device is very suitable for incorporation in a control loop with which a large bandwidth is to be obtained. Owing to the smooth transition between driving and active braking, it is also achieved that such a control loop functions accurately. The sensor signal can be derived, for example, from the detected back-emf voltage or can be generated by means of a separate sensor, such as an opto-coupler, a capacitive sensor or an inductive sensor which detects a certain position of an element that is driven by the motor. The reference signal can be, for example, a periodic signal whose frequency represents a certain desired speed of rotation of the motor and/or whose phase represents a certain desired position of the element driven by the motor. The output stage always energizes, for example, two of the three windings of a 3-phase motor in accordance with a given pattern of commutation states in order to generate a rotary magnetic field. It is to be noted that in the known motor control device, the direction of the current through the windings also differs between certain commutation states. However, the rotor is driven in all the commutation states of the known motor control device.

An embodiment of the motor control device in accordance with the invention is characterized in that the output stage is arranged in series with the power supply stage. Owing to this measure, the current through the windings is not only independent of the commutation signal, but is also independent of the commutation state of the output stage. As a result of this, the control elements used for the output stage need not comply with any requirements as regards linearity or a similar response to the applied control signals. This makes it possible to use, for example, MOSFETs.

An embodiment of the motor control device in accordance with the invention is characterized in that the power-supply stage comprises a pulse-width modulator adapted to supply a bidirectional current to the windings via the outputs of the output stage, this current depending on the phase-error signal. This measure results in a substantial reduction of the dissipation in the motor control device. Preferably, the output stage is designed so as to be symmetric between a first terminal and a second terminal for the connection of a power-supply source, and the pulse-width modulator supplies positive pulses, the pulses being applied to the first or the second terminal of the output stage in dependence upon the signal of the phase-error signal and the pulse width being dependent upon the magnitude of the phase-error signal.

An embodiment of the motor control device in accordance with the invention is characterized in that the power-supply stage comprises a controllable current source. By means of this measure, it is achieved that the behavior of a control loop, in which the motor control device has been included, is independent of the series resistance of the windings, the self-inductance of the windings and the back-emf produced in the windings. The resistance of the windings varies with the temperature. Particularly when used in portable equipment such as, for example, a camera or a portable computer, said measure provides a substantial improvement. The generated back-emf varies with the speed of rotation of the rotor. By means of said measure, it is also achieved that the control behavior of a control loop in which the motor control device has been included, is less dependent upon the speed of rotation of the rotor. This is important in, for example, cameras in which the motor drives a shutter which shields the image sensor from incident light at a given rate. Such a motor is operated at different speeds in dependence on the video format.

An embodiment of the motor control device in accordance with the invention is characterized in that the phase detector generates a phase-error signal in the form of a pulse which is narrow relative to the period of the reference signal, and which has an energy content proportional to the phase difference between the sensor signal and the reference signal. Such a pulse can be produced by means of circuits which are known per se and which are, moreover, simple if both the reference signal and the sensor signal are pulse-shaped or rectangular. By generating a pulse which is narrow relative to the period of the reference signal, it is achieved that the rotor is already accelerated or decelerated with said period. This results in a further increase of the bandwidth of the control loop which includes the motor control device.

An embodiment of the motor control device in accordance with the invention is characterized in that the motor control device comprises a series arrangement of a second-order low-pass filter and a differentiator, arranged between the phase detector and the output stage, for converting the pulse into a bipolar control signal, and the power-supply stage is adapted to supply a current in dependence upon the bipolar control signal. By means of these measures, it is achieved that a detected phase difference is corrected rapidly while the average current through the motor remains substantially constant. This is mainly of importance in fields of use where disturbances lead to a brief increase or decrease of the friction to be overcome by the motor. After the disturbance, the friction is equal to that before the disturbance, as a result of which, the motor current should be restored to its value prior to the disturbance in order to prevent the average speed of the motor from increasing or decreasing in response to a correction of a disturbance. Said measures ensure that the effect of the disturbance does not cover a period of time much longer than the duration of the disturbance itself.

An embodiment of the motor control device in accordance with the invention is characterized in that the time constant of the low-pass filter is smaller than the period of the reference signal. By means of these measures, it is achieved that the acceleration and deceleration of the rotor is always based on the phase difference measured in the last period of the reference signal. This provides a further reduction of the duration of the effect of a disturbance.

The invention also relates to an apparatus for the recording and/or reproduction of information, comprising means for recording and/or reproducing information in a cycle, said cycle being in synchronism with a periodic reference signal, a motor for driving an element which cooperates with said recording and/or reproducing means, a sensor for detecting the position of said element, said sensor generating a sensor signal, and a motor control device in accordance with the invention.

By means of these measures, it is achieved that the information stream can be recorded or reproduced with a fixed cycle frequency. This is of particular importance in real-time systems and systems in which the amount of information is so large that it is undesirable to store the information temporarily during recording and/or reproduction.

An embodiment of the apparatus in accordance with the invention is characterized in that the recording and/or reproducing means comprises a frame transfer image sensor, and the element comprises a shutter for periodically blocking the image sensor. Such an apparatus is, for example, a camera for recording video images. In the case of a frame transfer image sensor, the image is periodically transferred from a pickup section to a read-out section. During this transfer, the image sensor is preferably shielded from incident light in order to preclude "smear" effects. Obviously, it is of great importance that the blocking and the transfer concur. As a result of disturbing external influences, such as shocks or camera movements, the motor which drives the shutter should temporarily overcome a higher or a lower friction, which can give rise to a phase difference between the blocking of the image sensor by the shutter and the image transfer. By means of the measures in accordance with the invention, this phase difference is corrected rapidly, which precludes visible "smear" effects.

An embodiment of the apparatus in accordance with the invention is characterized in that the element comprises an information carrier, and the recording and/or reproducing means comprises a head for writing information on the information carrier. Such an apparatus is, for example, a disk drive, the information carrier being a magnetic disk or an optical disk and the head being a magnetic head or an optical head, respectively. By means of the measures in accordance with the invention, the speed of the disk can be controlled accurately, as a result of which a uniform information stream is obtained during writing and/or reading.

BRIEF DESCRIPTION OF THE DRAWINGS

The invention will be now be described in more detail, by way of example, with reference to the drawings, in which.

DESCRIPTION OF THE PREFERRED EMBODIMENTS

Figure 1:
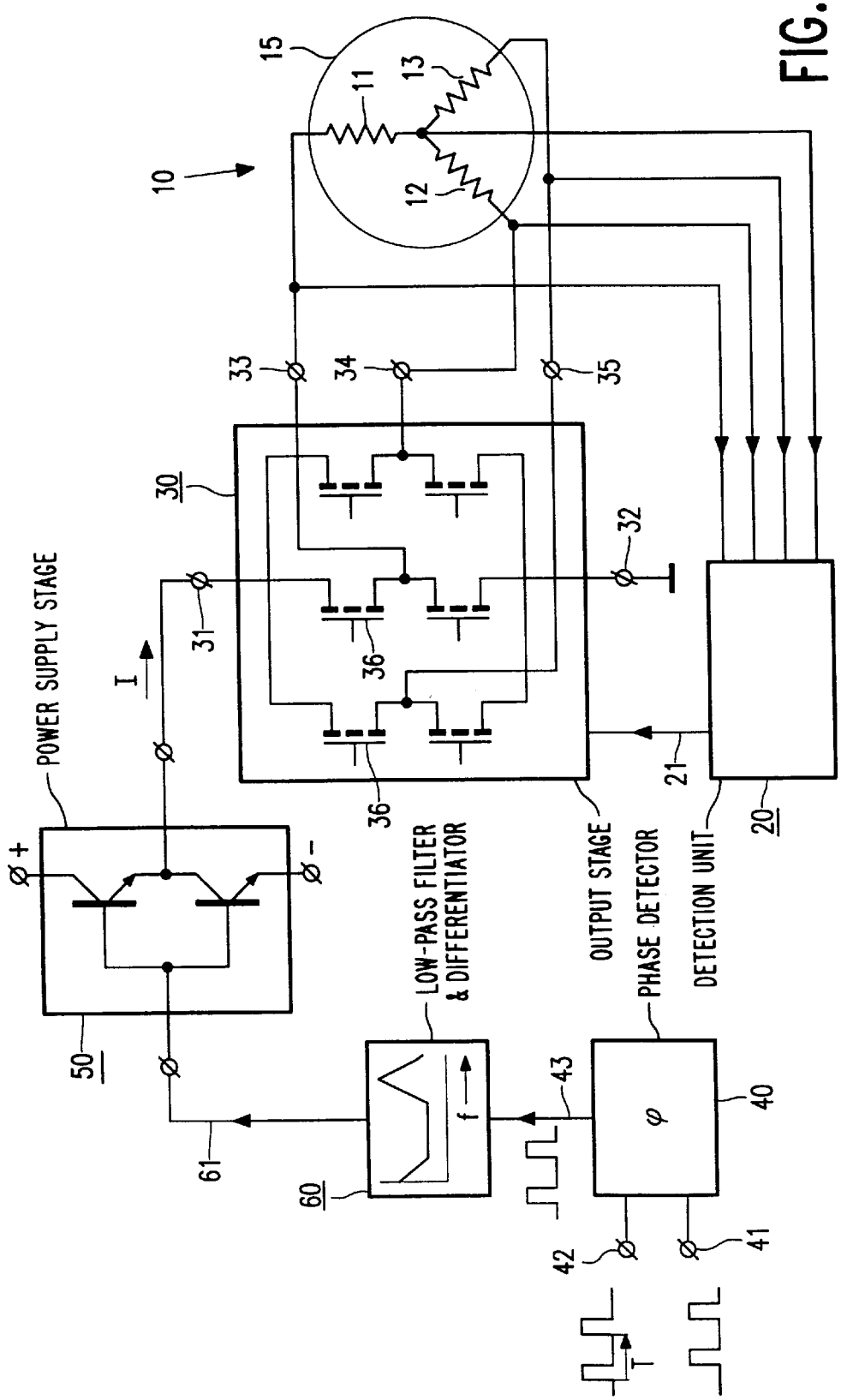
FIG. 1 shows diagrammatically, a first embodiment of the motor control device in accordance with the invention.

FIG. 1 shows diagrammatically, a first embodiment of the motor control device in accordance with the invention. The motor control device is adapted to control an electric 3-phase brushless d.c. motor 10 comprising a magnetic rotor 15 and three windings 11, 12, 13. The motor control device comprises a detection unit 20 adapted to generate a commutation signal 21 which is representative of the position of the rotor 15 relative to the windings. The commutation signal 21 is generated on the basis of the back-emf voltage produced in the windings 11, 12 and 13. The motor control device further comprises an output stage 30 having a first terminal 31 and a second terminal 32 for the connection of a power-supply source, outputs 33, 34, 35 for the connection of the windings 11, 12 and 13 and a number of controllable semiconductor elements 36 for selectively coupling the terminals 31, 32 to the outputs 33, 34, 35 in dependence upon the commutation signal 21.

The motor control device further comprises a phase detector 40 having a first input 41 for receiving a periodic sensor signal and a second input 42 for receiving a periodic reference signal. The phase detector 40 is adapted to generate a phase-error signal 43 which is representative of the phase difference between the sensor signal and the reference signal. The output stage 30 is arranged in series with a controllable power-supply stage 50, which is adapted to feed a bidirectional current I through the windings 11, 12 and 13 via the outputs 33, 34, 35. In dependence upon the phase-error signal 43, the current I is controlled so as to drive the rotor 15 in a controlled manner, or to brake this rotor actively. The phase detector 40 generates a phase-error signal 43 in the form of a pulse which is narrow relative to the period T of the reference signal (see FIG. 3a), this pulse having an energy content proportional to the phase difference between the sensor signal and the reference signal. A series arrangement 60 of a second-order low-pass filter and a differentiator is arranged between the phase detector 40 and the power-supply stage. The time constant of the low-pass filter is smaller than the period T of the reference signal. The series arrangement 60 assures that the phase-error signal 43 is converted into a bipolar control signal (see FIGS. 3b–3d), which is used for controlling the controllable power-supply stage 50. The series arrangement can have, for example, a frequency response as shown in the block 60. In such a case, a PID controller is obtained, which supplies a composite control signal 61 based on a proportional component, an integrated component and a differentiated component of the phase-error signal. The power-supply stage 50 comprises a controllable current source, as a result of which the current through the windings 11, 12 and 13 depends directly on the control signal 61.

Figure 2:
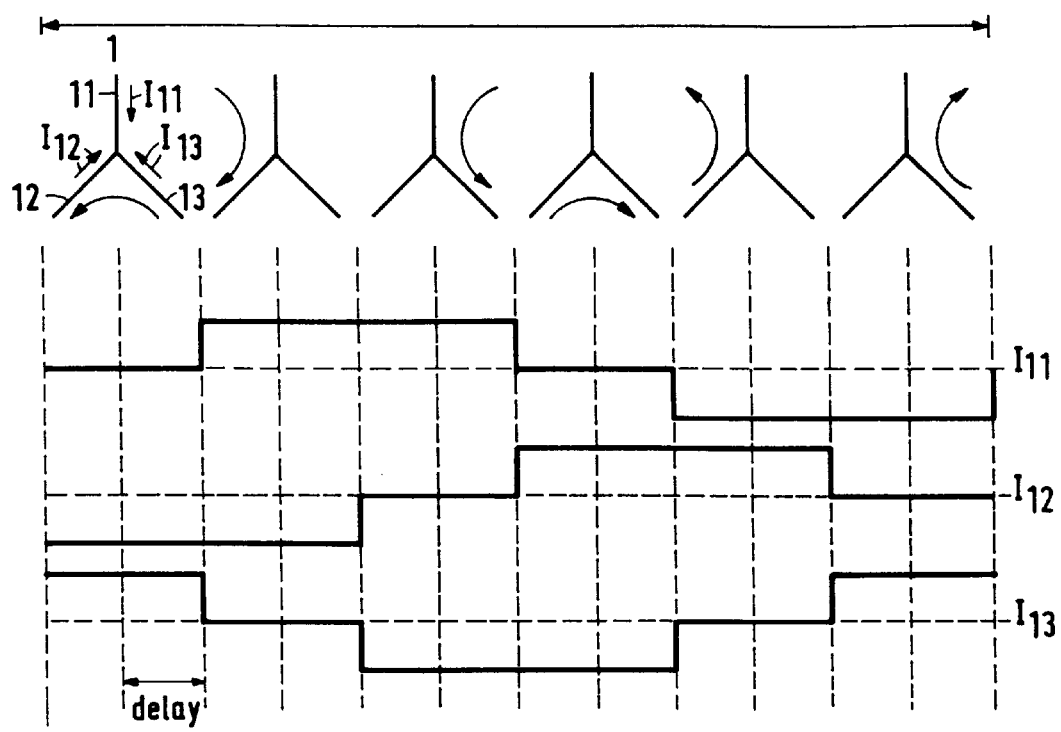
FIG. 2 shows diagrammatically, the currents through the windings as a function of time.

FIG. 2 shows diagrammatically the currents through the windings as a function of time. To drive the rotor 15 currents $I_{11}$, $I_{12}$ and $I_{13}$ are fed through the windings 11, 12 and 13, these currents generating a rotary field in accordance with a cyclic pattern, referred to as a commutation cycle. In the case of a 3-phase motor having six magnetic pole pairs, six commutation signals correspond to one mechanical revolution of the rotor 15. One commutation cycle consequently corresponds to an angular rotation of 60°. The commutation is controlled on the basis of the commutation signal 21 (see FIG. 1). In order to drive the rotor 15, the semiconductor elements 36 in the output stage 30 (see FIG. 1) should be switched over at the correct instants. The switching instant is determined by the detection unit 20 (see FIG. 1). Each time two of the three windings are energized.

Figure 3A:
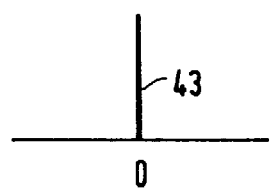
FIGS. 3a–3d illustrate how the bipolar control signal is derived from the phase-error signal.
Figure 3B:
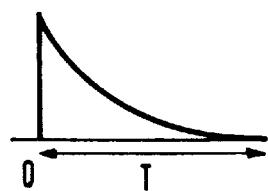
Figure 3C:
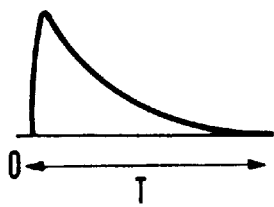
Figure 3D:
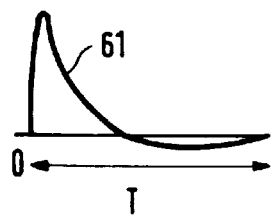

FIGS. 3a–3d illustrate how the bipolar control signal is derived from the phase-error signal. FIG. 3a shows the phase-error signal 53, which is generated by the phase detector 40 (see FIG. 1) and which is pulse-shaped, the energy content of the pulse being proportional to the phase difference between the sensor signal and the reference signal. FIG. 3b shows a signal which is obtained after a first low-pass filter. FIG. 3c shows a signal which is obtained after a second low-pass filter, and FIG. 3d shows the bipolar control signal 61, which is obtained after a differentiator.

Figure 4:
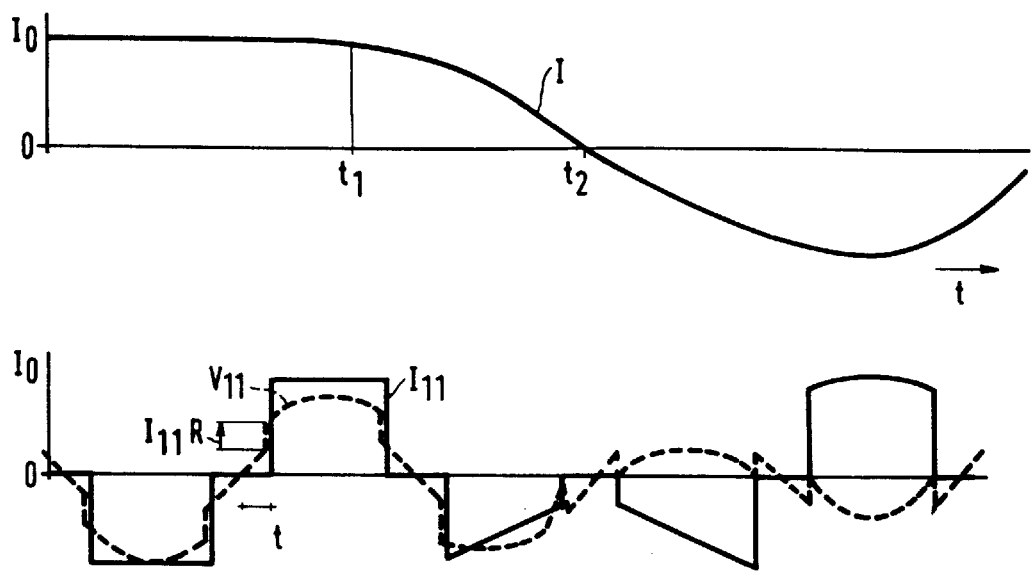
FIG. 4 shows the current supplied by the power-supply stage, the voltage across and the current through one of the windings as a function of time during a corrective action of a control loop which includes the motor control device.

FIG. 4 shows the current supplied by the power-supply stage, the voltage across and the current through one of the windings as a function of time during a corrective action of a control loop which includes the motor control device. The current I supplied by the power-supply stage 50 varies in dependence upon the bipolar control signal 61 (see FIGS. 3a–3d). Initially, the power-supply stage supplies a current $I=I_0$ until the instant $t=t_1$ at which the current I decreases, becomes negative and subsequently increases again until I=I0 (not shown). The current $I_{11}$ through the winding 11 initially has a value $I=I_0$ and is switched, as shown in FIG. 2, on the basis of the commutation signal 21 (see FIG. 1). The voltage across the winding 11 is equal to the back-emf plus the voltage $I_{11} \cdot R$, where R is the electrical resistance of the winding 11. From the instant $t=t_1$, the current $I_{11}$ decreases in magnitude but is still in phase with $V_{11}$. After $t=t_2$, the current I supplied by the power-supply stage becomes negative and, as a consequence, the current $I_{11}$ through the winding 11 is in phase opposition to the voltage $V_{11}$. As a result, the current $I_{11}$ through the winding 11 can be controlled as regards its direction and magnitude independently of the commutation signal 21. The commutation signal 21 is based on the zero crossings of the back-emf voltage. When a zero crossing is detected in the back-emf a new, commutation should be effected after a $\Delta t$ equal to 30°. During these zero crossings, the current $I_{11}$ through the winding 11 is zero, so that $V_{11}$ corresponds to the back-emf voltage. The variation of the current I by means of the power-supply stage 50 does not affect the voltage $V_{11}$ during the zero crossings, so that the generation of the commutation signal 21 is not influenced. As a result of this, commutation and control between driving and active braking of the rotor 15 proceed wholly independent of each other.

Figure 5:
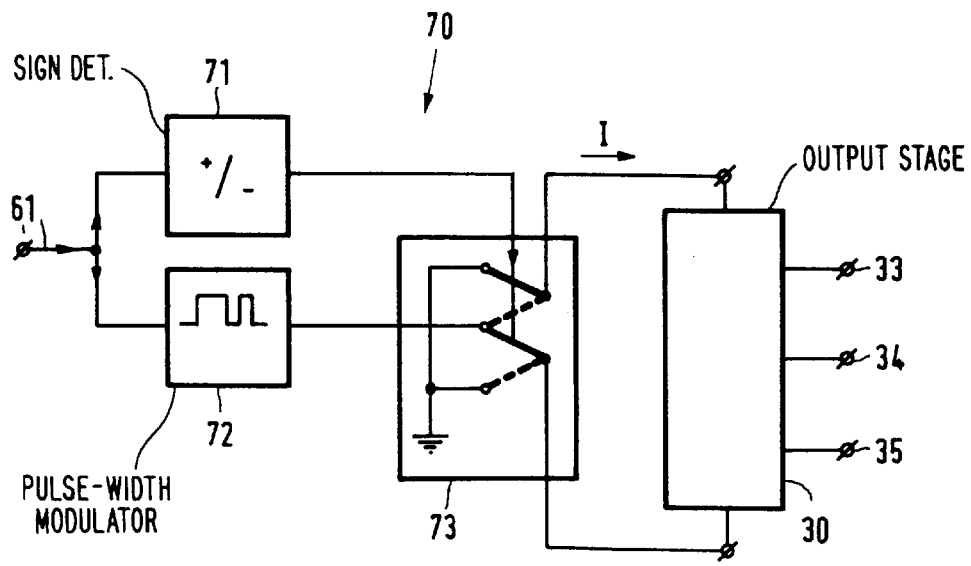
FIG. 5 shows diagrammatically, a power-supply stage and an output stage in a second embodiment of the motor control device in accordance with the invention.

FIG. 5 shows, diagrammatically, a power-supply stage and an output stage in a second embodiment of the motor control device in accordance with the invention. The power-supply stage 70 is adapted to supply a bidirectional current I via the outputs 33, 34, 35 of the output stage 30, this current depending on the bidirectional control signal 61 and being independent of the commutation signal. The power-supply stage 70 comprises a pulse-width modulator 72 which supplies positive pulses of a given width depending on the magnitude of the control signal 61. The power-supply stage 70 further comprises a sign detector 71, which, depending on the sign of the control signal 61, actuates a switch 73 to reverse the direction of the current I applied to the output stage 30.

Figure 6:
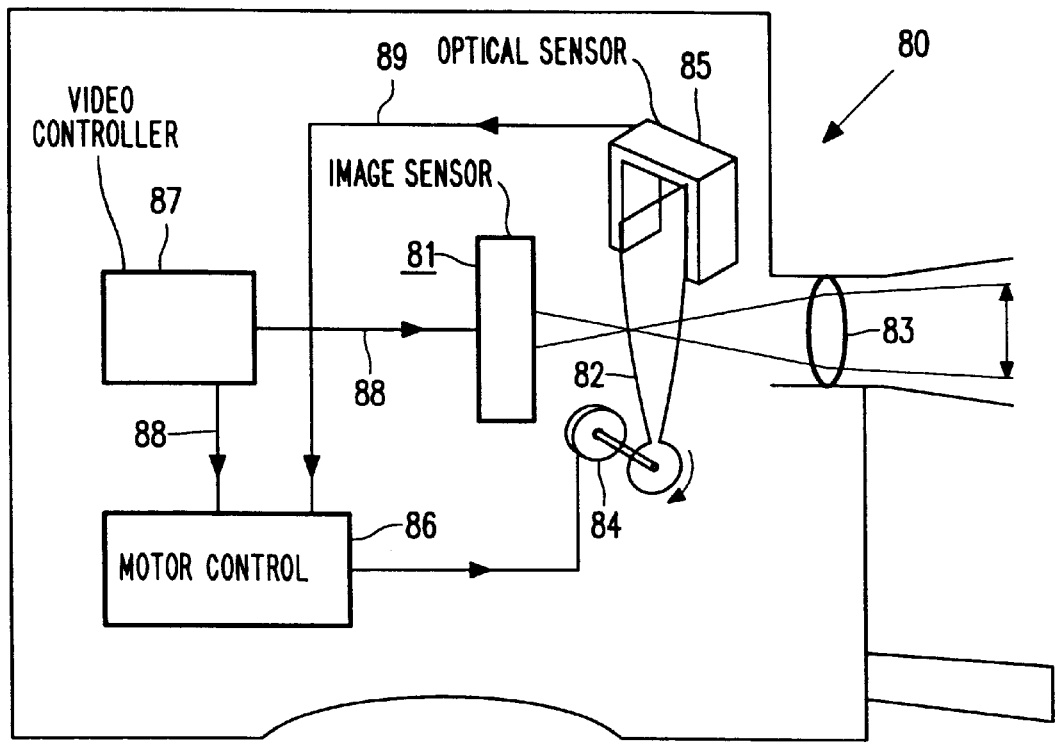
FIG. 6 shows a first embodiment of the apparatus in accordance with the invention.

FIG. 6 shows a first embodiment of an apparatus in accordance with the invention. The apparatus is a camera 80 for recording video images and comprises a frame transfer image sensor 81 and a shutter 82 for periodically blocking the image sensor 81. The shutter 82 is driven by a motor 84, which is controlled by a motor control device 86 as described above. By means of a video controller 87, a periodic reference signal 88 is generated, which, each time, initiates a read-out cycle of the image sensor 81. The position of the shutter 82 is detected by an optical sensor 85, which generates a periodic sensor signal 89. The sensor signal 89 and the reference signal 88 are both applied to the motor control device 86, a control loop being formed which ensures that the image sensor 81 is shielded from light which is incident through a lens 83 during a read-out cycle. In other words, this control loop ensures that the read-out and the movement of the shutter 82 are in a fixed phase relationship.

Figure 7:
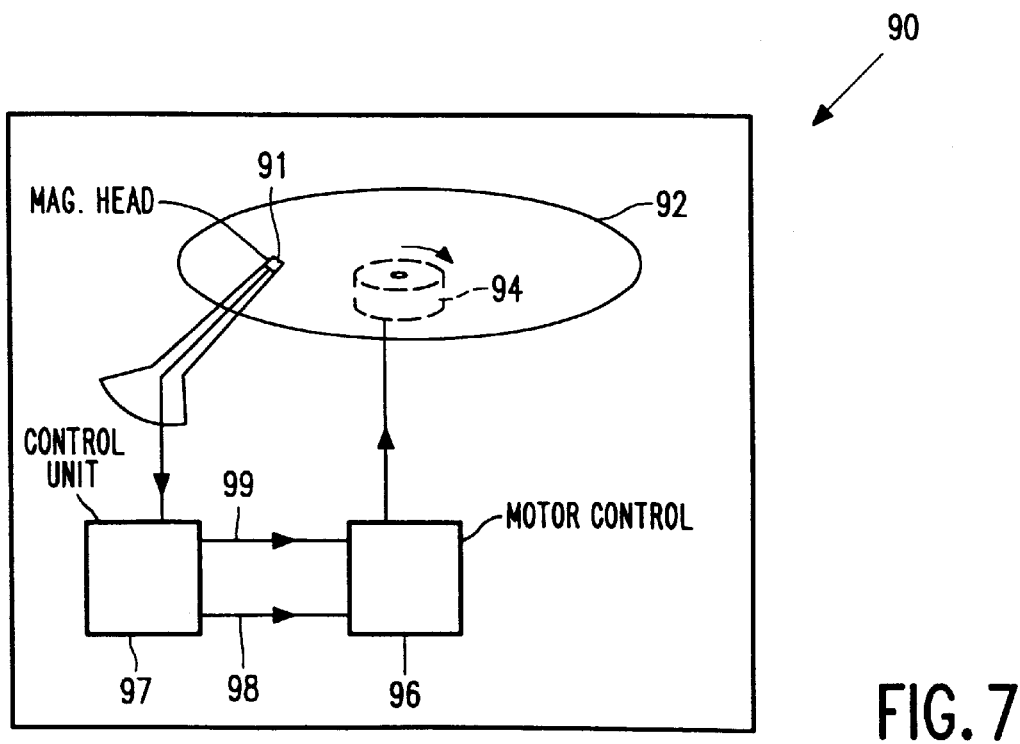
FIG. 7 shows a second embodiment of the apparatus in accordance with the invention.

FIG. 7 shows a second embodiment of the apparatus in accordance with the invention. The apparatus is a hard-disk unit 90 for the recording and/or reproduction of information. The hard-disk unit 90 comprises a magnetizable disk 92 and a magnetic head 91 connected to a control unit 97. The disk 92 is driven by a motor 94 which is controlled by a motor control device 96 as described in the foregoing. The control unit 97 generates a periodic reference signal 98 derived from, for example, an information stream to be stored on the disk 92. The control unit 97 also generates a periodic sensor signal 99 derived from, for example, a servo signal read from the disk 92 by the head 91. The sensor signal 99 and the reference signal 98 are both applied to the motor control device 96, a control loop being formed which ensures that the speed of rotation of the disk 92 corresponds to the information stream to be stored on the disk 92.

It is to be noted that the invention is not limited to the embodiments described above. The invention can, for example, also be employed in an image display device in which said recording and/or reproducing means generates a radiation beam and said element comprises a mirror for moving the radiation beam over a screen in a given cycle time, the radiation beam being modulated on the basis of an information stream in order to display an image on the screen. Besides, the output stage 30 and the power-supply stage 50 can be integrated, the control elements 36 being controlled continuously in response to the bidirectional control signal 61 and the direction of the current through the motor being reversed by turning on the appropriate control elements in dependence upon the sign of the bidirectional control signal 61.

We claim:

1. A motor control device for controlling an electric multi-phase brushless d.c. motor having a magnetic rotor and a plurality of windings,
said motor control device comprising:
   a detection unit for generating a commutation signal in dependence on a back-emf voltage produced in the windings; and
   an output stage having outputs for connecting the output stage to the windings, at least one terminal for connecting the output stage to a power-supply source, and a plurality of control elements for selectively coupling the at least one terminal to the outputs in dependence upon the commutation signal,
characterized in that the motor control device further comprises:
   a phase detector having a first input for receiving a periodic sensor signal related to an instantaneous position of the magnetic rotor, and a second input for receiving a periodic reference signal, said phase detector generating a phase-error signal representative of a phase difference between the periodic sensor signal and the periodic reference signal, the phase-error signal being in the form of a pulse which is narrow relative to a period of the periodic reference signal, said pulse having an energy content proportional to the phase difference between the periodic sensor signal and the periodic reference signal;
   a controllable power-supply stage for supplying a bidirectional current via the outputs of the output stage in dependence upon the phase-error signal for driving and braking the magnetic rotor in a controlled manner; and
   a series arrangement of a second-order low-pass filter and a differentiator, arranged between the phase detector and the output stage, for converting the pulse into a bipolar control signal, the power-supply stage supplying the bidirectional current in dependence upon the bipolar control signal.

2. A motor control device as claimed in claim 1, characterized in that the output stage is arranged in series with the power-supply stage.

3. A motor control device as claimed in claim 1, characterized in that the power-supply stage comprises a pulse-width modulator for supplying the bidirectional current to the windings via the outputs of the output stage, said bidirectional current depending on the phase-error signal.

4. A motor control device as claimed in claim 1, characterized in that the power-supply stage comprises a controllable current source.

5. A motor control device as claimed in claim 1, characterized in that a time constant of the low-pass filter is smaller than the period of the periodic reference signal.

6. An apparatus for recording and/or reproducing information, said apparatus comprising:
   means for recording and/or reproducing information in a cycle, said cycle being in synchronism with a periodic reference signal;
   a motor for driving an element which cooperates with said recording and/or reproducing means, said motor being an electric multi-phase brushless d.c. motor having a magnetic rotor and a plurality of windings;
   a sensor for detecting a position of said element, said sensor generating a sensor signal; and
   a motor control device for controlling the motor, said motor control device comprising:
      a detection unit for generating a commutation signal in dependence on a back-emf voltage produced in the windings; and
      an output stage having outputs for connecting the output stage to the windings, at least one terminal for connecting to output stage to a power-supply source, and a plurality of control elements for selectively coupling the at least one terminal to the outputs in dependence upon the commutation signal,
characterized in that the motor control device further comprises:
   a phase detector having a first input for receiving a periodic sensor signal related to an instantaneous position of the magnetic rotor, and a second input for receiving a periodic reference signal, said phase detector generating a phase-error signal representative of a phase difference between the periodic sensor signal and the periodic reference signal, the phase-error signal being in the form of a pulse which is narrow relative to a period of the periodic reference signal, said pulse having an energy content proportional to the phase difference between the periodic sensor signal and the periodic reference signal;
   a controllable power-supply stage for supplying a bidirectional current via the outputs of the output stage in dependence upon the phase-error signal for driving and braking the magnetic rotor in a controlled manner; and
   a series arrangement of a second-order low-pass filter and a differentiator, arranged between the phase detector and the output stage, for converting the pulse into a bipolar control signal, the power-supply stage supplying the bidirectional current in dependence upon the bipolar control signal.

7. An apparatus as claimed in claim 6, characterized in that the recording and/or reproducing means comprises a frame transfer image sensor, and the element comprises a shutter for periodically blocking the image sensor.

8. An apparatus as claimed in claim 6, characterized in that the element comprises an information carrier, and the recording and/or reproducing means comprises a head for writing information on the information carrier.

* * * * *

Disclaimer 5,990,641—Marinus C. W. Van Buul; Gerardus A. M. Van Beijsterveld; Nicolaas J. Damstra, all of Breda; Henricus C. J. Bühker, Mierlo, all of (NL). MOTOR CONTROL DEVICE APPARATUS FOR THE RECORDING AND/OR REPRODUCTION OF INFORMATION INCLUDING THE MOTOR CONTROL DEVICE. Patent dated November 23, 1999. Disclaimer filed March 28, 2008, by the assignee, U.S. Philips Corporation.

Hereby enters this disclaimer to all claims of said patent.

(*Official Gazette October 7, 2008*)